(12) United States Patent
Shyu et al.

(10) Patent No.: US 7,295,388 B2
(45) Date of Patent: Nov. 13, 2007

(54) LENS MODULE

(75) Inventors: San-Wei Shyu, Taipei (TW);
Shih-Chao Huang, Taipei (TW);
Hsien-Ru Chu, Taipei (TW)

(73) Assignee: E-Pin International Co., Ltd., Taipei (TW)

(*) Notice: Subject to any disclaimer, the term of this patent is extended or adjusted under 35 U.S.C. 154(b) by 160 days.

(21) Appl. No.: 11/284,880

(22) Filed: Nov. 23, 2005

(65) Prior Publication Data

US 2007/0115565 A1    May 24, 2007

(51) Int. Cl.
*G02B 7/02* (2006.01)

(52) U.S. Cl. .................. 359/814; 359/676; 359/683; 359/694; 359/824; 369/44.15; 369/44.16; 720/681; 720/682; 720/683; 396/133; 396/529

(58) Field of Classification Search ............... 359/676, 359/683, 694, 814, 824; 369/44.15, 44.16; 720/681–683; 362/455; 396/133, 529

See application file for complete search history.

(56) References Cited

U.S. PATENT DOCUMENTS

2006/0214520 A1* 9/2006 Tseng ........................ 310/14

* cited by examiner

*Primary Examiner*—Hung Xuan Dang
*Assistant Examiner*—Joseph Martinez
(74) *Attorney, Agent, or Firm*—Troxell Law Office, PLLC (57) ABSTRACT

A lens module using electromagnetic force to drive the focus-adjusting lens is disclosed. The lens module includes a base, two steel plates, four springs, a bottom plate, a lens holder, a coil, a lens, a top plate, two magnets, a magnet housing and a top cover. The lens holder, the coil and the top plate are disposed outside the circumference of the lens to form a linked body and the coil is clipped between the lens holder and the top plate so as to reduce diameter and volume of the coil. By the two arc magnets disposed on right and left sides of the coil instead of general circular magnets, volume of the magnets is reduced. By the four springs vertically hooked between four corners of two steel plates respectively and four corresponding brackets of the lens holder, the lens is provided with axial traction for focus adjustment. Therefore, the lens with smaller volume moves steadily to adjust the focus.

3 Claims, 9 Drawing Sheets

LENS MODULE

BACKGROUND OF THE INVENTION

The present invention relates to a lens module, especially to a lens module applied on digital cameras or mobile phones that uses electromagnetic force to driving the lens for adjusting focus.

Digital cameras or mobile phones with a shot function have a lens module with a focus-adjusting device. The lens modules available now are designed with features of light, think, compact, precision and durability. Traditional focus-adjusting devices also use electromagnetic force. However, the coil is disposed around a linked body with lens and a magnetic surrounding the coil is also a circular magnetic (like a ring) so that the parts occupy quite large volume. Moreover, traditional lens modules use spring blades to be balanced with the electromagnetic force. The spring blade is easy to be distorted by external force, such as vibration, returning back or after being used for a period of time so that the stability and the precision of focus-adjustment are influenced.

SUMMARY OF THE INVENTION

Therefore, it is a primary object of the present invention to provide a lens module that uses a lens holder, a coil and a top plate clipped outside the circumference of a lens to form a linked body and the coil is clipped between the lens holder and the top plate so as to reduce diameter and volume of the coil. Thus the volume of the lens module is reduced.

It is another object of the present invention to provide a lens module that uses two arc magnets disposed on right and left sides of the coil instead of general circular magnets for reducing volume of magnets so as to make the lens module have reduced volume.

It is a further object of the present invention to provide a lens module that uses four springs instead of conventional spring blades. The four springs are vertically arranged on four corners of two steel plates respectively and each vertically hooks with a corresponding bracket on circumference of the lens holder so as to provide axial traction to the lens for adjusting focus. Thus the lens moves steadily to adjust the focus.

DETAILED DESCRIPTION OF THE PREFFERED EMBODIMENT

Refer from FIG. 1 to FIG. 9, a lens module 1 in accordance with the present invention consists of a base 10, two steel plates 20, four springs 30, a bottom plate 40, a lens holder 50, a coil 60, a lens 70, a top plate 80, two magnets 90, a magnet housing 100 and a top cover 110. The lens holder 50, the coil 60 and the top plate 80 are arranged around the lens 70 and are assembled to form a linked body 2 moving synchronously, a shown in FIG. 2. The linked body 2, the steel plate 20, the springs 30, the bottom plate 40, magnets 90, and the magnet housing 100 are disposed between the base 10 and the top cover 110 so as to from a lends module 1. The linked body 2 zooms in/out in the lens module 1 so as to make the lens 70 adjust focus.

Figure 5:
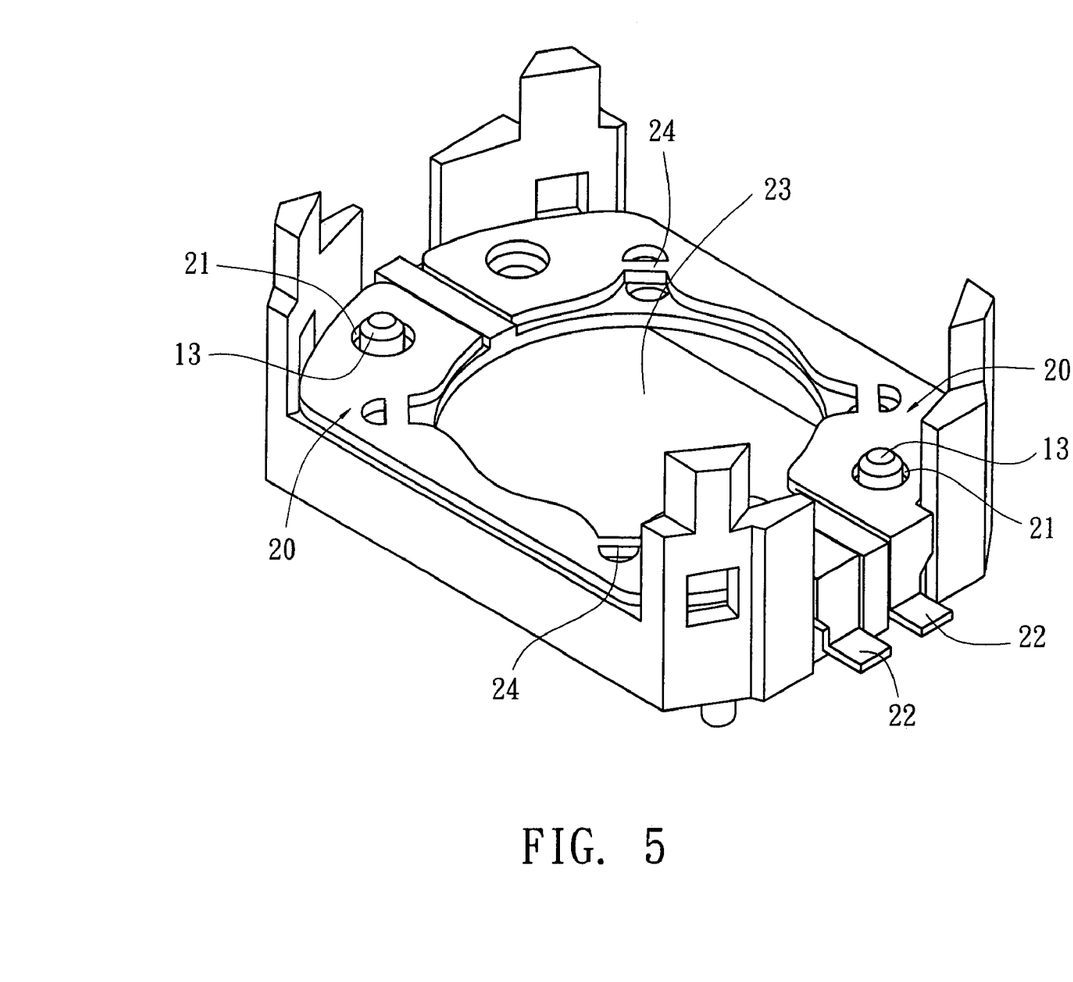
FIG. 5 is an assembling view showing that two steel plates arranged on top of a base of the present invention.
Figure 6:
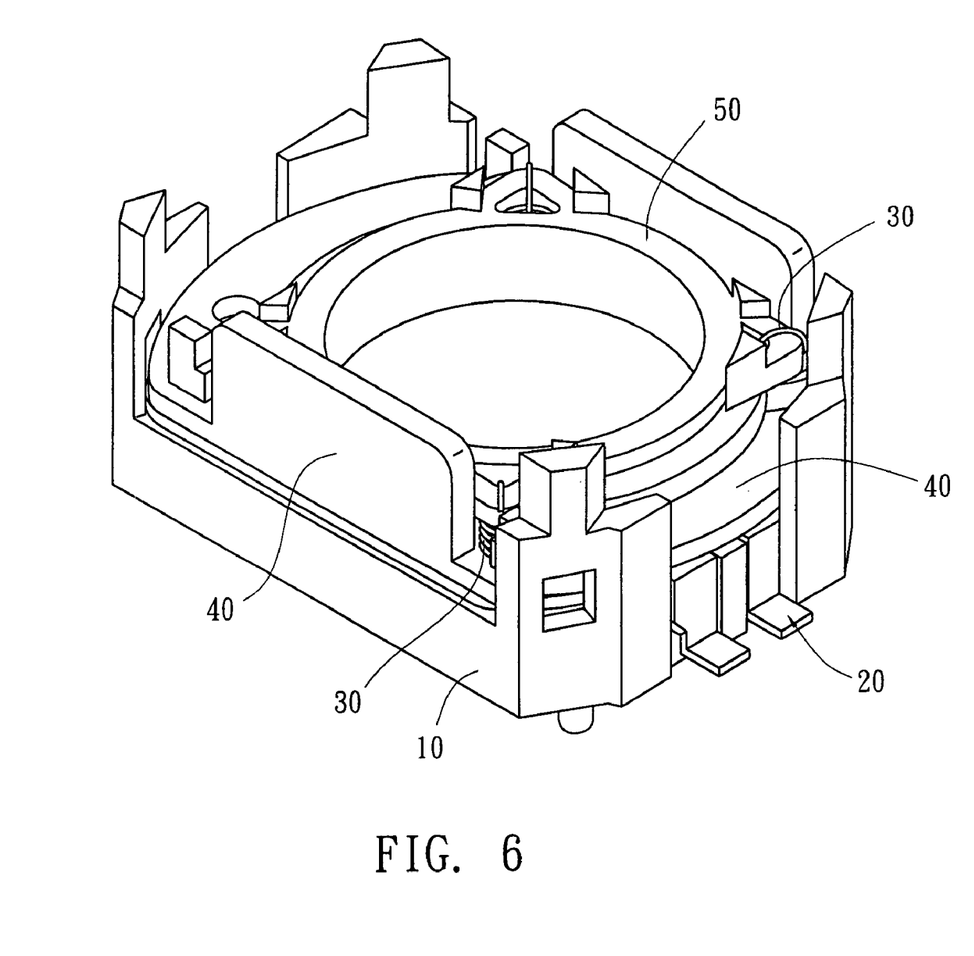
FIG. 6 is an assembling view showing that four springs, a bottom plate, and a lens holder further assembled with the embodiment in FIG. 5.

Refer from FIG. 5 to FIG. 9, the base 10 is a rectangular frame with four brackets 11 on four corners for being assembled with the top cover 110. An insertion hole 12 is disposed on center of the base 10 for providing optical pathway of the lens 70. The two steel plates 20 are conductive copper sheets with symmetrical shape that includes a locating hole 21 corresponding to a locating pin 13 on the base 10. By the locating hole 21 in combination with the a locating pin 13, the steel plates 20 are fastened on the base 10 respectively in electrical isolation status status, as shown in FIG. 5. Through a lug 22, the steel plates 20 are connected with different electrodes. Moreover, a central hole 23 corresponding to the insertion hole 12 formed between the two steel plates 20. Four bridging pieces 24 are disposed in equal distance on edge of circumstance of the central hole 23 for hooking with a spring for balancing 30 respectively so that the four springs 30 locate on edge of circumstance of the central hole 23 and are symmetrical to axis of the central hole 23. By the spring 30 made from metal, electrodes of the two steel plates 20 are connected to a head 61 and a tail 62 of the coil 60. The bottom plate 40 with an insertion hole 41 corresponding to the insertion hole 12, in the center thereof, covers over the two steel plates 20. A flange 42 with four equidistant insertion slot 43 locates on circumstance of the insertion hole 41. The insertion slots 43 corresponding to a spring 30 respectively so that the spring 30 inserts through the insertion slot 43 and hooks the lens holder 50, as shown in FIG. 6.

Figure 3:
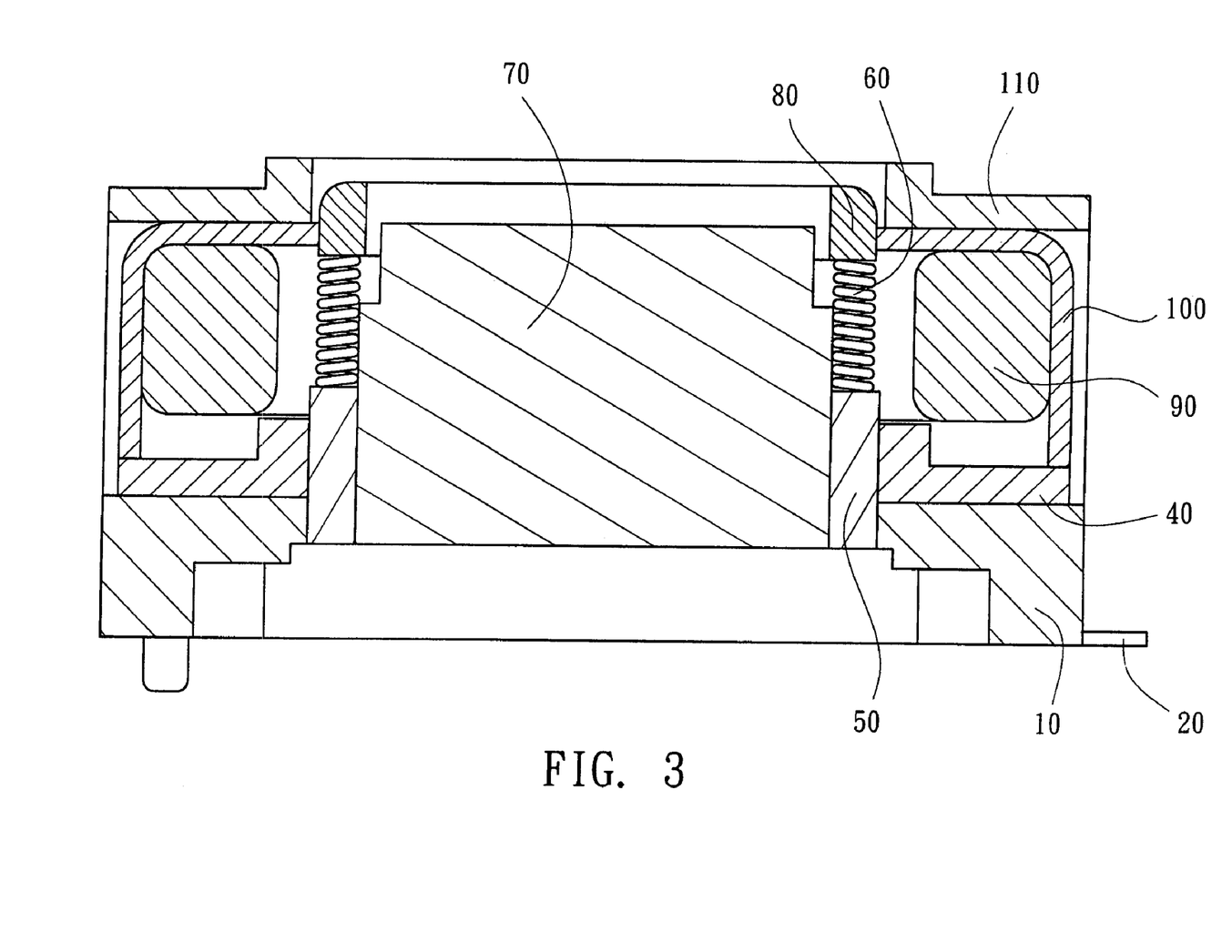
FIG. 3 is a cross-sectional view of the embodiment in FIG. 1 in accordance with the present invention.
Figure 4:
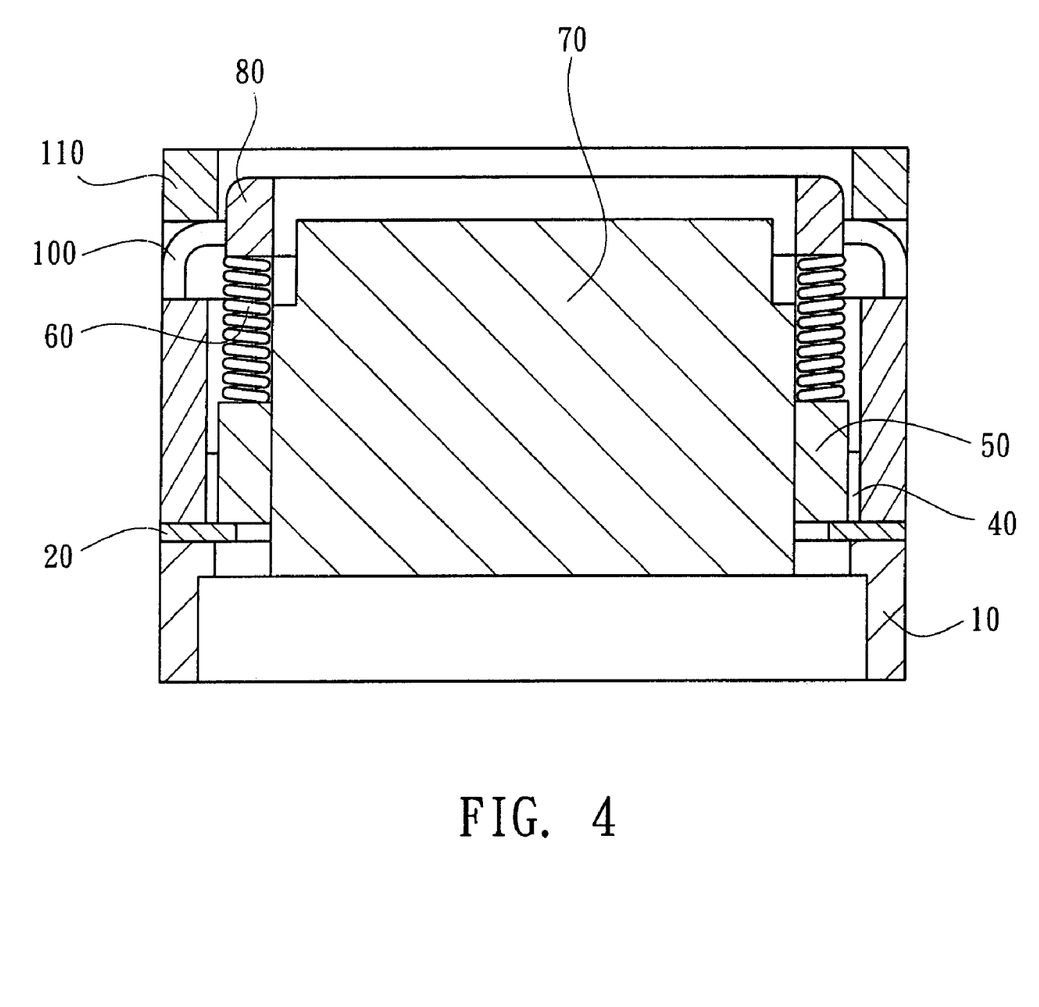
FIG. 4 is another cross-sectional view of the embodiment in FIG. 1 in accordance with the present invention.
Figure 7:
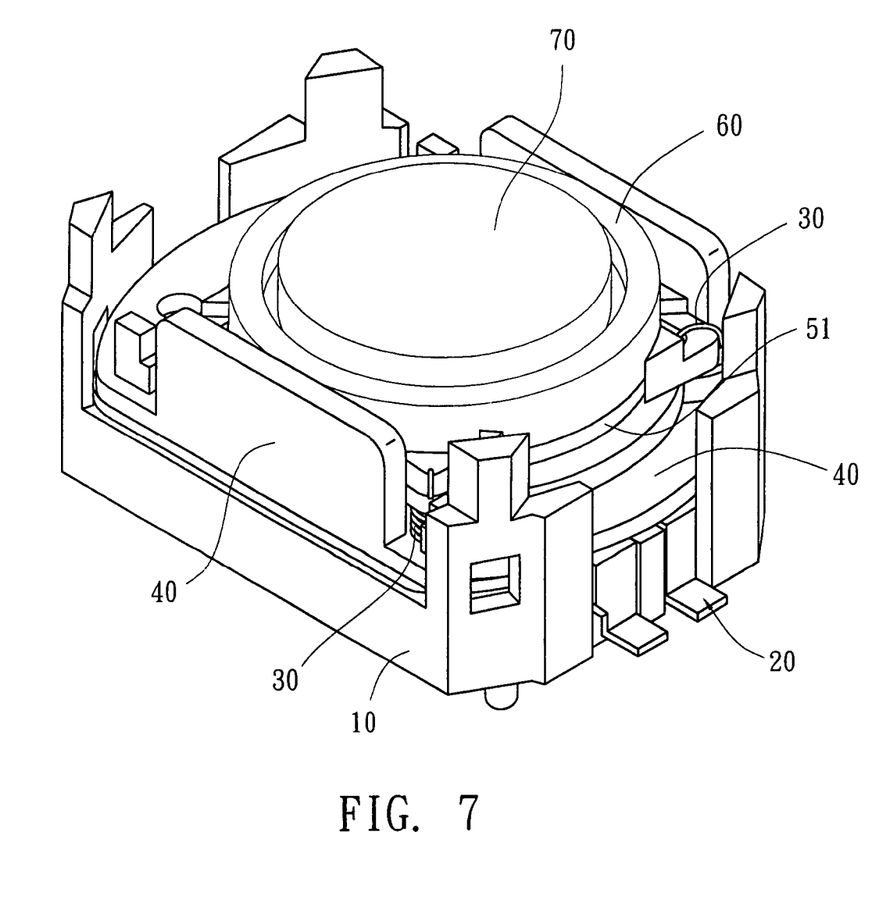
FIG. 7 is an assembling view showing that a coil and lens further arranged on the embodiment in FIG. 6.
Figure 8:
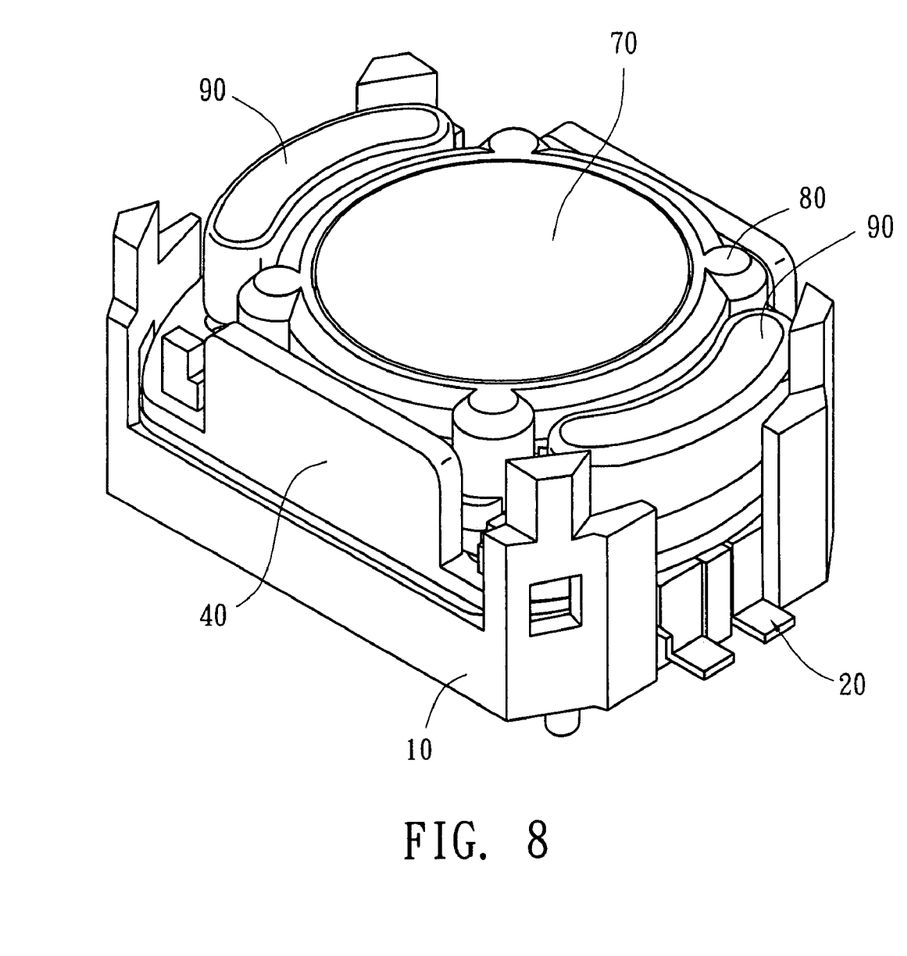
FIG. 8 is an assembling view showing that a top plate and magnets assembled with the embodiment in FIG. 7.

Furthermore, two symmetrical lining 44 are arranged outside the flange 42 of the bottom plate 40. The lens holder 50 is composed from a circular frame 51 and four lugs 52, corresponding to four springs 30, on circumference of the circular frame 51. The four springs 30 respectively hooks with corresponding lug 52 so as to apply force on the lens holder 50 and thus make the circular frame 51 moves steadily inside the insertion hole 41 defined by the flanges 42 of the bottom plate 40. The coil 60 is vertically disposed on top of the circular frame 51 of the lens holder 50, as shown in FIG. 7 and the head 61 as well as the tail 62 is connected with different electrodes. The design of the top plate 80 matches the lens holder 50. The top plate 80 includes a circular frame 81, and four locking member 82 projecting outwards, located on circumference of the circular frame 81. The top plate 80, the coil 60 and the lens holder 50 are clipped outside the lens 70 so as to from a linked body 2 while the coil 60 is clipped between the circular frame 81 of the top plate 80 and the circular frame 51 of the lens holder 50, as shown in FIG. 3, FIG. 4, & FIG. 8. so that the diameter and the volume of the coil 60 are reduced. The two magnets 90 are two symmetrical arc magnets that is installed outside left and right sides of the coil 60 respectively for replacing circular magnets generally disposed outside the coil, as shown in FIG. 8. Thus the volume of the magnets 90 is reduced. The electrodes and currents of the head 61 and the tail 62 of the coil 60 can be changed and in combination with the magnets 90 (N, S poles) to generate electromagnetic force with various strength and different directions so as to drive the linked body 2 (with the lens 70 therein) to adjust the focus.

Figure 1:
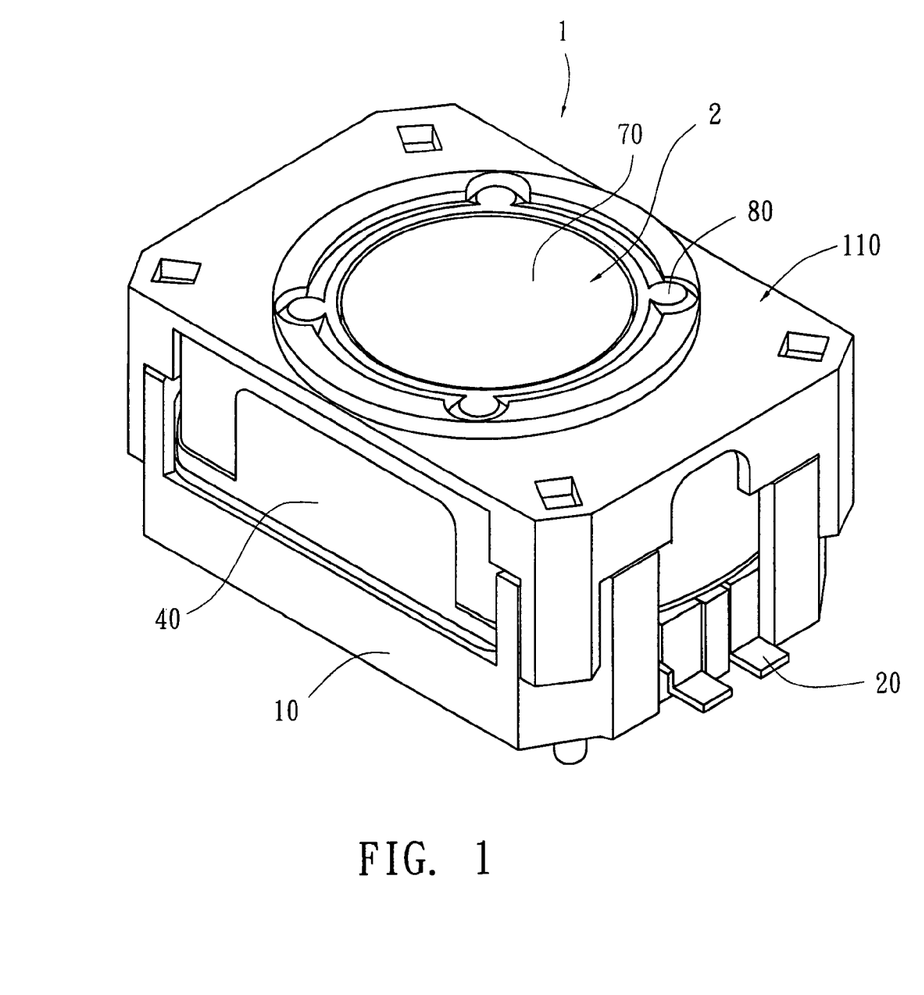
FIG. 1 is a perspective view of an embodiment in accordance with the present invention.
Figure 2:
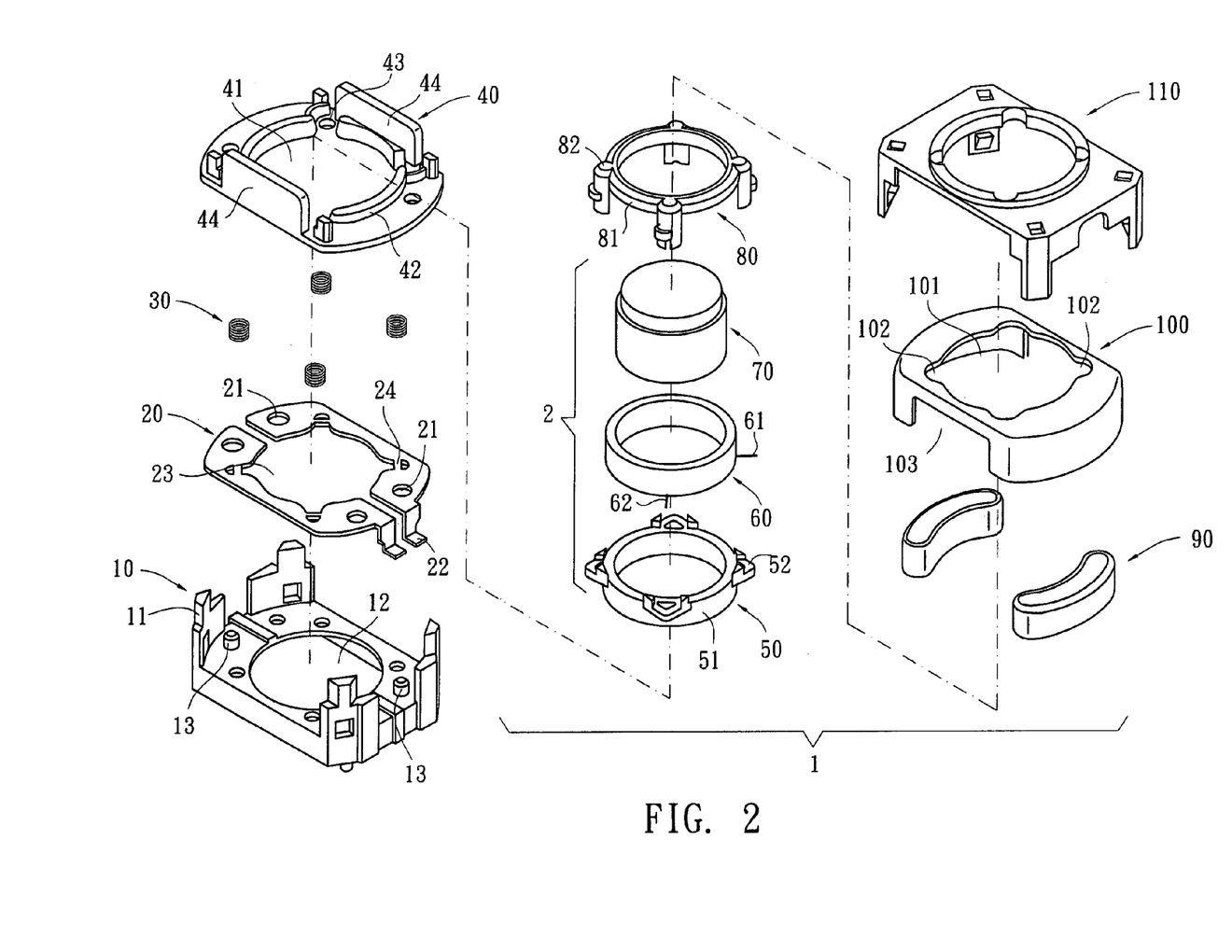
FIG. 2 is an explosive view of the embodiment in FIG. 1 in accordance with the present invention.
Figure 9:
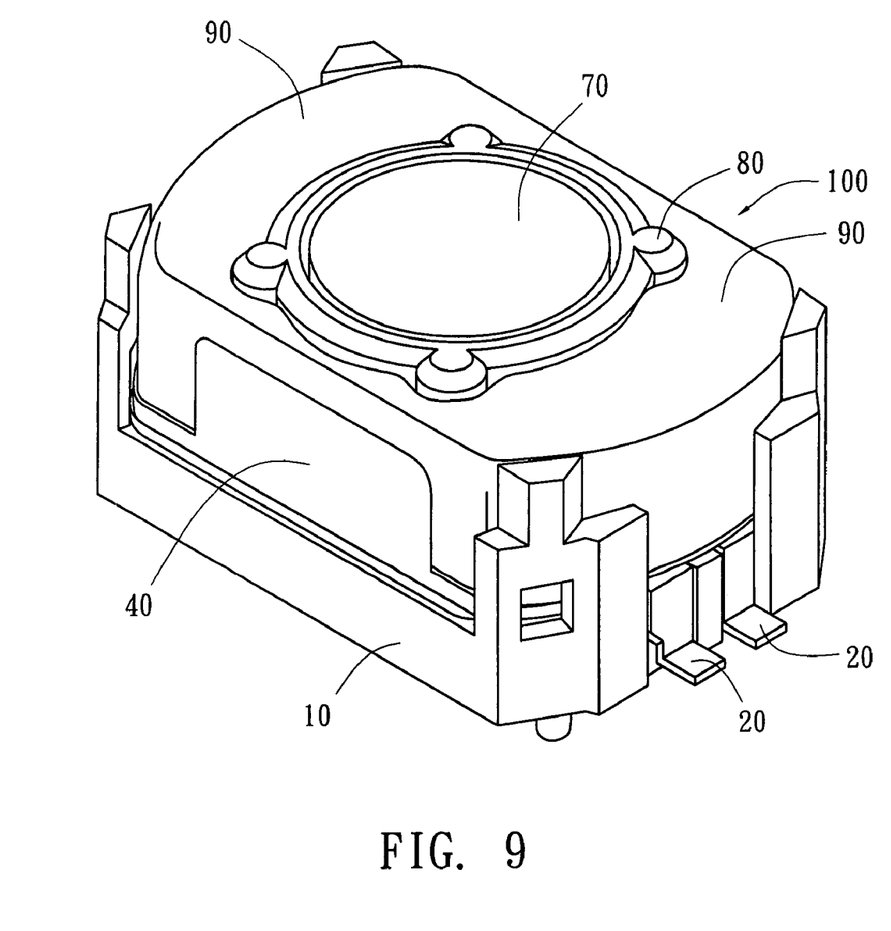
FIG. 9 is an assembling view showing that a magnet housing is arranged on the embodiment in FIG. 8.

The magnet housing 100 is like a cap that covers on top of the two magnets 90 so that the two magnets 90 are clipped and located between the magnet housing 100 and the bottom plate 40, as shown in FIG. 3, FIG. 4 & FIG. 9. The magnet housing 100 having a central slot 101 and four symmetrical slots 102 outside edge of the circumference of the central slot 101. The central slot 101 and the slots 102 respectively correspond to the circular frame 81 and the locking members 82 of the top plate 80 so that the linked body 2 with lens 70 therein zooms out or zooms in through the central slot 101 while processing the focus adjustment. In addition, a vertical slot 103 corresponding to the lining 44 of the bottom plate 40 is disposed on two sides of the magnet housing 100 that are different from the sides with magnets 90. After the magnet housing 100 covering on top of the two magnets 90, the vertical slot 103 assembles with the lining 44 closely, as shown in FIG. 1 so as to prevent crud infiltrating into the inner space of the lens module 1. The top cover 110 is a cap with the same shape of the base 10 so that they can lock with each other for assembling into part of the lens module 1.

In usage, the electromagnetic force generated between the coil 60 and the magnets 90 can be selected to generate only upward electromagnetic force. When in a focal position, there is no current passing through the coil 60 so that no electromagnetic force generates. The linked body (having the lens holder 50, the coil 60, the lens 70, and the top plate 80) stays in original position, only drawn by the four springs 30 without influence of the electromagnetic force. While adjusting focus, current passes through the coil 60 so as to generate electromagnetic force by which the liked body 2 moves toward the object being shot, in close-focus status. When the electromagnetic force acting on the linked body 2 equals to the tension of the spring, the linked body 2 stays in an adjusted close-focus position. Therefore, the position of the linked body 2 is adjustable by control of the currents passing through the coil 60.

Compared with traditional focus adjustable lens, the lends module in accordance with the present invention has the following improvements:

(1) The coil 60 of the present invention is directly clipped between the circular frame 51 of the lens holder 50 and the circular frame 81 of the top plate 80 so that the coil 60 is mounted inside the two circular frames 51, 81 with certain thickness. Thus the diameter of the linked body 2 only includes diameter of the lens 70 and thickness of the circular frame 51 (81). Therefore, the diameter as well as volume of the linked body 2 is reduced effectively and the volume of the lens module 1 is also reduced.

(2) The two arc magnets 90 of the present invention are disposed on right and left sides outside the coil 60 so that only diameter of the right and left sides is increased but the other sides-front and read sides keep the same. Thus the volume of the magnets is reduced and so does the volume of the lens module 1.

(3) The four springs 30 arranged between bridging pieces 24 of the steel plates 20 and four corresponding lugs 52 of the lens holder respectively of the present invention provide the linked body 2 (including the lens) elasticity for focus adjustment so that the lens 70 can move steadily to adjust the focus.

What is claimed is:

1. A lens module comprising a base, two steel plates, four springs, a bottom plate, a lens holder, a coil, a lens, a top plate, two magnets, a magnet housing and a top cover, wherein the base is a rectangular frame having four locking brackets on four corners for being assembled with the top cover and an insertion hole is disposed on center of the base for providing optical pathway of a lens;

the steel plates are conductive copper sheets with symmetrical shape, fastened on the base respectively in electrical isolation status and connected with different electrodes by a lug; a central hole is formed between the two steel plates corresponding to the insertion hole of the base and four bridging pieces are disposed in equal distance on edge of circumference of the central hole for hooking with a spring that inserts through the bottom plate and hooks with four corresponding lugs on circumference of the lens holder;

the bottom plate with an insertion hole in the center thereof covers over the two steel plates and a flange with four equidistant insertion slots on circumstance thereof is arranged on edge of the insertion hole; each of the insertion slot corresponds to a spring respectively so that the spring inserts through the insertion slot and hooks the lens holder; two symmetrical lining are arranged outside the flange; the lens holder having a circular frame and four lugs on circumference of the circular frame; the lugs corresponds to four springs respectively thus each of the springs hooks with corresponding lug so as to apply force on the lens holder and make the circular frame moves vertically inside the insertion hole of the bottom plate;

the coil is disposed on top of the circular frame of the lens holder and the head as well as the tail of the coil is connected with different electrodes;

the top plate having a circular frame and four locking member projecting outwards, located on circumference of the circular frame; the top plate, the coil and the lens holder are clipped outside the lens so as to from a linked body driven by electromagnetic force while the coil is clipped between the circular frame of the top plate and the circular frame of the lens holder;

the magnets are two symmetrical arc magnets that is installed outside left and right sides of the coil respectively; when electrodes and currents of the head and tail of the coil are changes, electromagnetic force is generated to drive the linked body for focus adjustment;

the magnet housing is a cap that covers on top of the two magnets so that the two magnets are clipped between the magnet housing and the bottom plate; the magnet housing having a central slot and four symmetrical slots outside edge of the circumference of the central slot, respectively correspond to the circular frame and the locking members of the top plate so that the linked body zooms out or zooms in through the central slot while adjusting the focus;

the top cover is locked with the bottom plate so as to make the linked body,the two steel plates, the four springs the bottom plate, the two magnets, and the magnet housing be disposed between the top cover and the base to form a lends module;

thereby when there is no current through the coil and no electromagnetic force is generated, the linked body with the lens therein stays in original a focal position, being forced by elasticity of the four springs; while adjusting the focus, certain amount of current passes through the coil to generate electromagnetic force that make the linked body zoom out and when the electromagnetic force applied on the linked body equals to tension of the springs, the linked body stays in an adjusted close-focus position.

2. The lens module as claimed in claim 1, wherein the different electrodes of the two steel plates are connected to the head and the tail of the coil respectively by spring made from metal.

3. The lens module as claimed in claim 1, wherein a vertical slot is disposed on two sides of the magnet housing without magnets clipped outside, corresponding to two lining of the bottom plate so that the slots assembly with the linings closely after the magnet housing covering over the two magnets for preventing infiltration of curd into inner space of the lens module.

* * * * *